US011954701B2

(12) United States Patent
Wald

(10) Patent No.: US 11,954,701 B2
(45) Date of Patent: Apr. 9, 2024

(54) REAL-TIME MERCHANDISING SYSTEM

(71) Applicant: Visa International Service Association, San Francisco, CA (US)

(72) Inventor: Jerry Wald, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 164 days.

(21) Appl. No.: 16/826,359

(22) Filed: Mar. 23, 2020

(65) Prior Publication Data

US 2021/0295367 A1 Sep. 23, 2021

(51) Int. Cl.
| G06Q 30/0207 | (2023.01) |
| G06Q 20/10 | (2012.01) |
| G06Q 20/32 | (2012.01) |
| G06Q 20/38 | (2012.01) |
| G06Q 30/0235 | (2023.01) |
| H04B 1/3827 | (2015.01) |

(52) U.S. Cl.
CPC ....... *G06Q 30/0224* (2013.01); *G06Q 20/108* (2013.01); *G06Q 20/3223* (2013.01); *G06Q 20/383* (2013.01); *G06Q 30/0235* (2013.01); *G06Q 30/0237* (2013.01); *H04B 1/3827* (2013.01)

(58) Field of Classification Search
None
See application file for complete search history.

(56) References Cited

U.S. PATENT DOCUMENTS

| 5,459,306 | A | * | 10/1995 | Stein | G06Q 30/02 235/375 |
| 6,055,513 | A | * | 4/2000 | Katz | G06Q 10/02 705/14.24 |
| 7,630,986 | B1 | * | 12/2009 | Herz | G06Q 10/10 |
| 8,401,957 | B2 | * | 3/2013 | Forlai | G06Q 30/00 705/26.7 |

(Continued)

FOREIGN PATENT DOCUMENTS

| CN | 102781119 A | 11/2012 | |
| JP | 2004054426 A * | 2/2004 | ............. G06F 17/60 |

(Continued)

OTHER PUBLICATIONS

King, Nancy J. Profiling the Mobile Customer—Privacy Concerns When Behavioural Advertisers Target Mobile Phones. (Sep. 2010). Retrieved online Dec. 27, 2021. https://ir.library.oregonstate.edu/downloads/vh53ww39w (Year: 2010).*

(Continued)

*Primary Examiner* — James A Reagan
(74) *Attorney, Agent, or Firm* — The Webb Law Firm

(57) ABSTRACT

The disclosure relates to a real-time merchandising system for the communication of offers and the acceptance or rejection of the communicated offers. The offers communicated may be based on the location of the merchandising system, the time of day and the user device that is in proximity of the system. The merchandising system may require no, or a minimum of, user interaction for an offer to be accepted or rejected or for the offer to expire. It may also be configured to track and analyze offer campaign effectiveness.

17 Claims, 5 Drawing Sheets

(56) References Cited

U.S. PATENT DOCUMENTS

| | | | | |
|---|---|---|---|---|
| 8,407,334 B2* | 3/2013 | Bennett | G06Q 30/0251 | 709/223 |
| 8,799,065 B2* | 8/2014 | Reuthe | G06Q 20/04 | 705/14.34 |
| 9,049,259 B2* | 6/2015 | Rathod | G06Q 50/01 | |
| 9,361,623 B2* | 6/2016 | Angell | G06Q 30/0201 | |
| 9,420,044 B2 | 8/2016 | Gupta et al. | | |
| 9,576,292 B2* | 2/2017 | Freishtat | G06Q 30/0617 | |
| 10,068,222 B2* | 9/2018 | Soffer | G06Q 20/204 | |
| 10,083,411 B2* | 9/2018 | Kinsey, II | G06Q 30/0282 | |
| 10,223,707 B2* | 3/2019 | Granville, III | G06Q 30/0207 | |
| 10,346,839 B2* | 7/2019 | Ovick | G06Q 20/34 | |
| 10,402,760 B2* | 9/2019 | Kinsey, II | G06Q 30/0282 | |
| 10,607,249 B2* | 3/2020 | Loomis | G06F 16/951 | |
| 10,623,451 B2* | 4/2020 | Rathod | H04L 65/4061 | |
| 10,824,975 B2* | 11/2020 | Kinsey, II | G06Q 30/0631 | |
| 11,157,954 B1* | 10/2021 | Belanger | G06Q 30/0201 | |
| 2007/0067297 A1* | 3/2007 | Kublickis | G06Q 30/02 | 707/999.009 |
| 2007/0214030 A1* | 9/2007 | Shear | G06Q 30/0257 | 705/345 |
| 2008/0034228 A1* | 2/2008 | Shear | G06Q 30/00 | 713/194 |
| 2008/0097842 A1* | 4/2008 | Tirumala | G06Q 30/0242 | 705/14.58 |
| 2008/0097843 A1* | 4/2008 | Menon | G06Q 30/0256 | 705/14.1 |
| 2008/0103805 A1* | 5/2008 | Shear | G06Q 30/06 | 705/1.1 |
| 2008/0109240 A1* | 5/2008 | Shear | G06F 16/285 | 705/1.1 |
| 2008/0109242 A1* | 5/2008 | Shear | G06Q 30/0257 | 705/1.1 |
| 2008/0189360 A1* | 8/2008 | Kiley | H04L 69/329 | 709/203 |
| 2009/0106100 A1* | 4/2009 | Mashinsky | G06Q 50/188 | 707/999.005 |
| 2009/0254971 A1* | 10/2009 | Herz | G06Q 30/0603 | 726/1 |
| 2010/0312768 A1* | 12/2010 | Shear | G06Q 30/06 | 707/E17.089 |
| 2011/0040609 A1* | 2/2011 | Hawkins | G06Q 30/02 | 705/1.1 |
| 2011/0137716 A1* | 6/2011 | Reuthe | G06Q 20/04 | 705/14.17 |
| 2011/0137717 A1* | 6/2011 | Reuthe | G06Q 30/0215 | 707/E17.014 |
| 2011/0276396 A1* | 11/2011 | Rathod | H04L 51/066 | 705/14.49 |
| 2012/0022934 A1* | 1/2012 | Forlai | G06Q 30/00 | 705/14.23 |
| 2013/0097664 A1* | 4/2013 | Herz | G06Q 10/10 | 726/1 |
| 2014/0129942 A1* | 5/2014 | Rathod | H04N 21/44222 | 715/720 |
| 2014/0136259 A1* | 5/2014 | Kinsey, II | G06Q 30/0627 | 705/7.16 |
| 2014/0136264 A1* | 5/2014 | Kinsey, II | G06Q 30/0282 | 705/7.19 |
| 2014/0136265 A1* | 5/2014 | Kinsey, II | G06Q 30/0631 | 705/7.19 |
| 2014/0136266 A1* | 5/2014 | Kinsey, II | G06Q 30/0282 | 705/7.19 |
| 2014/0136373 A1* | 5/2014 | Kinsey, II | G06Q 30/0282 | 705/26.63 |
| 2014/0136443 A1* | 5/2014 | Kinsey, II | G06Q 30/0282 | 705/347 |
| 2014/0143216 A1* | 5/2014 | Shear | G06Q 30/0271 | 707/694 |
| 2014/0372190 A1* | 12/2014 | Reuthe | G06Q 20/04 | 705/14.17 |
| 2016/0012465 A1* | 1/2016 | Sharp | G06Q 20/386 | 705/14.17 |
| 2016/0041534 A1 | 2/2016 | Gupta | | |
| 2016/0255139 A1* | 9/2016 | Rathod | H04N 1/32101 | 709/203 |
| 2017/0300975 A1* | 10/2017 | Iannace | G06Q 30/0266 | |
| 2018/0005260 A1* | 1/2018 | Loomis | G06Q 20/3224 | |
| 2018/0189273 A1* | 7/2018 | Campos | H04L 51/02 | |
| 2018/0189793 A1* | 7/2018 | Campos | H04L 51/214 | |
| 2018/0189794 A1* | 7/2018 | Campos | H04L 63/0815 | |
| 2018/0189859 A1* | 7/2018 | Campos | H04L 63/0815 | |
| 2018/0191644 A1* | 7/2018 | Campos | G06F 16/9535 | |
| 2018/0192364 A1* | 7/2018 | Campos | G06Q 30/0224 | |
| 2018/0309801 A1* | 10/2018 | Rathod | H04L 67/141 | |
| 2019/0050889 A1* | 2/2019 | Halligan | G06Q 30/0236 | |
| 2019/0052701 A1* | 2/2019 | Rathod | H04L 12/1827 | |
| 2019/0087850 A1* | 3/2019 | Loomis | G06Q 30/0253 | |
| 2019/0102791 A1* | 4/2019 | Park | G06F 16/24568 | |
| 2020/0184408 A1* | 6/2020 | Kinsey, II | G06Q 30/0631 | |
| 2021/0021649 A1* | 1/2021 | Rathod | H04L 65/1069 | |
| 2021/0224723 A1* | 7/2021 | Kinsey, II | G06Q 30/0282 | |
| 2022/0129470 A1* | 4/2022 | Purves | G06Q 20/227 | |

FOREIGN PATENT DOCUMENTS

| | | | | |
|---|---|---|---|---|
| JP | 2004062472 A | * | 2/2004 | G06F 17/60 |
| JP | 2016181029 A | * | 10/2016 | G06Q 30/02 |

OTHER PUBLICATIONS

Nathan Newman. How Big Data Enables Economic Harm to Consumers, Especially to Low-Income and Other Vulnerable Sectors of the Population. (Aug. 24, 2014). Retrieved online Dec. 27, 2021. https://www.ftc.gov/system/files/documents/public_comments/2014/08/00015-92370.pdf (Year: 2014).*

Peter Pal Zubcsek. Predicting Mobile Advertising Response Using Consumer Co-Location Networks. (Feb. 9, 2017). Retrieved online Dec. 27, 2021. https://escholarship.org/content/qt3w58x5b5/qt3w58x5b5_noSplash_bdd31a7e07a0948a4034fd641ab90928.pdf (Year: 2017).*

* cited by examiner

REAL-TIME MERCHANDISING SYSTEM

BACKGROUND

1. Technical Field

The present disclosure relates to merchandising systems. More specifically, the disclosure relates to improved real-time merchandising.

Merchandisers use offers sent by mail, email or web pages to create loyalty and promote business. When possible, these may be targeted using what a merchant may know or learn about customer. Existing techniques for merchandising offers suffer from numerous shortcomings, including, but not limited to only providing offers through mass paper or email communications that consumers receive only when they read their mail or targeting consumers at a time of purchase or when reading the Internet. Thus, what is needed are techniques and technology advances that address these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiments of the present disclosure are illustrated by way of example, and not in any way by limitation, in the drawings of the accompanying figures and in which like reference numerals refer to similar elements and in which.

Figure 1:
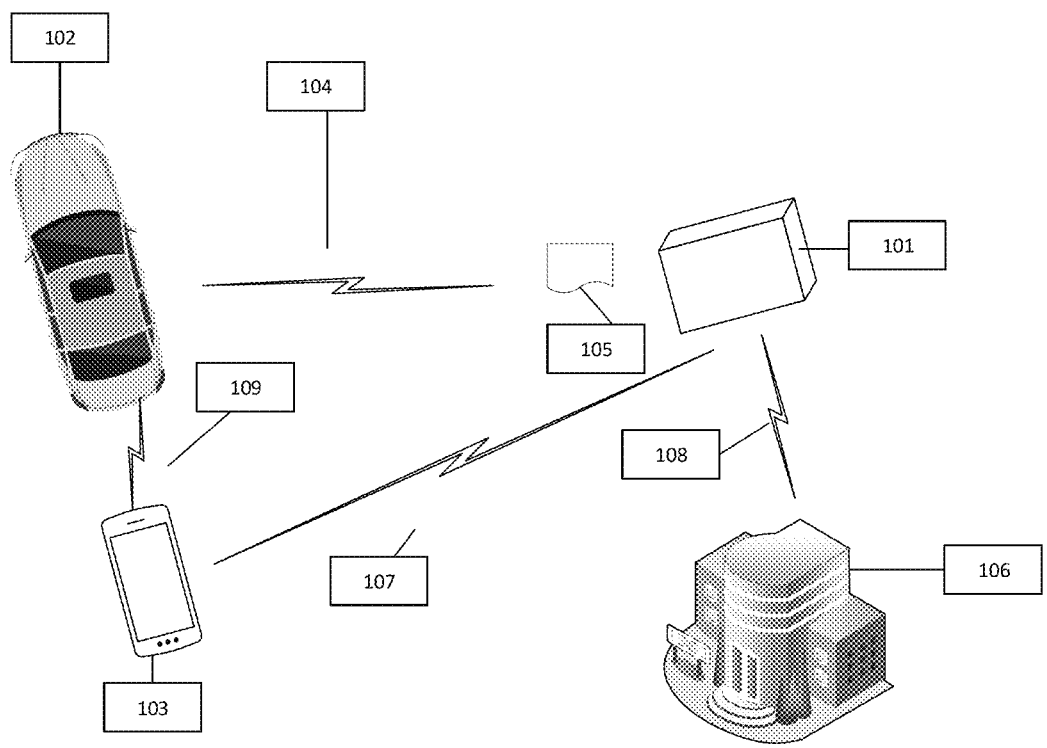
FIG. 1 is a non-limiting block diagram of a merchandising system operating according to one or more embodiments of the present disclosure.

While each of the figures illustrates a particular non-limiting embodiment for purposes of illustrating a clear example, other embodiments may omit, add to, reorder, combine and/or modify any of the elements shown in the figures.

DETAILED DESCRIPTION

In the following description, for the purposes of explanation and outlined below, numerous specific details are set forth in order to provide a thorough understanding of the example embodiments of the present disclosure. It will be apparent, however, that the example embodiments may be practiced without these specific details. In other instances, well-known structures and devices are shown in block diagram form in order to avoid unnecessarily obscuring the example non-limiting embodiments.

1.0 GENERAL OVERVIEW
2.0 NON-LIMITING EMBODIMENTS OF A COMPUTER SYSTEM IMPLEMENTATION
  2.1 NON-LIMITING EMBODIMENTS OF REPRESENTATIVE SYSTEM COMPONENTS
  2.2 NON-LIMITING EMBODIMENTS OF PROCESSING
  2.3 NON-LIMITING EMBODIMENTS OF ENABLING SOFTWARE
3.0 NON-LIMITING EMBODIMENTS OF PROCESS STEPS
4.0 OTHER ASPECTS OF DISCLOSURE

1.0 General Overview

Merchants need not wait for a consumer to open mail or search or read something on the Internet to proactively engage a consumer with an offer. Consumer mobile devices are now enabled to communicate their location, and thereby the presence of a possible consumer, to systems equipped to receive the location information. Relatedly, merchant signage is increasingly digital in nature, which now and in the future may enable the digital signage systems to broadcast or stream information to consumer devices equipped and in a location to receive this information. The ability of the mobile devices and digital signage systems to communicate and exchange information enables merchants to take advantage of heretofore unavailable opportunities to present dynamic real-time targeted and/or untargeted offers to consumers on the move and for consumers to accept or reject these offers either while they are on the move or at some later time.

2.0 Non-Limiting Embodiments of a Computer System Implementation

Prior to discussing embodiments of the disclosure, some terms can be described in further detail.

As used herein, the terms "communications" or "communicate" may refer to any remote communication capabilities, including, but not limited to, wireless, wired and/or optical communications using wireless, wired and/or optical data networks and protocols. Examples may include, but not be limited to, third-generation (3G), fourth-generation (4G), fifth-generation, (5G), Long-term Evolution (LTE), and other predecessor, future generation or similar networks, Local Area Net (LAN) networks based on the IEEE 802.11x standard (Wi-Fi®), Bluetooth® Based on Bluetooth® Special Interest (SIT) Standards, Wide Area Net (WAN) networks based on the IEEE 802.16 set of standards (Wi-Max®), Near Field Communications (NFC) based on SO/IEC 18092/ECMA-340-Near Field Communication Interface and Protocol-1 (NFCIP-1), ISO/IEC 21481/ECMA-352-Near Field Communication Interface and Protocol-2 (NFCIP-2), and a variety of existing standards including ISO/IEC 14443 Type A and Type B, and FeliCa, Broadband B-ISDN, TCP/IP (which as a minimum may include, but not be limited to, the Internet Protocol (IP), Address Resolution Protocol (ARP), Internet Control Message Protocol (ICMP), Transmission Control Protocol (TCP), User Datagram Protocol (UDP), Internet Group Management Protocol (IGMP), Neighbor Discovery Protocol (NDP), ICMPv6, and IGMPv6 and an integrated IPSec security layer), Simple Message Transfer Protocol (SMTP), FileTransfer Protocol (FTP), Code-Division Multiple Access (CDMA) protocol, Global System for Mobile (GSM) protocol, or any such preceding or future networks and/or those which may emerge, that may provide access to a network such as the Internet, a private network or a device, or any combination thereof.

Additional examples may include Ethernet, Fast Ethernet, IEEE 802.x standards, Local Talk, FDDI, and token ring wired standards and protocols and their future evolutions and equivalents. Further examples may include ESCON/SBCON (Enterprise System Connection/Serial Byte Connection), FDDI (Fiber Distributed Data Interface), Fibre Channel Standard, ATM (Asynchronous Transfer Mode)/SONET (Synchronous Optical Network), Gigabit Ethernet optical standards and protocols and their future evolutions and equivalents.

As used herein, the term "merchandising system" may refer to any device or system for displaying a sign, whether in print format, digital, projection, or some other format, including, but not limited to a movie screen, an outdoor sign, a billboard, a poster, an in-store sign, an in-store poster, an in-home screen or display, or a display on a mobile device.

As used herein, the term "device" may refer to a computing device capable of transmitting and/or receiving data. Examples of a "device" include, but are not limited to a vehicle such as an automobile, a mobile phone, smartphone, a laptop computer, a desktop computer, a server computer, a tablet, a wearable device, or any other computing device, or any combination thereof.

As used herein, the term "mobile device" may refer to a device that may be operated while the consumer is mobile, such as a vehicle, a mobile phone, a smartphone, a laptop computer, a tablet, or a wearable device.

As used herein, the term "commercial data" may refer to data or information that describes characteristics of a purchase, merchant, transaction, and/or other commercial qualities. Examples of commercial data may include, but are not limited to, purchased item data, purchase amount data, purchase frequency, purchase time of day data, merchant category data, merchant frequency of use/interaction data, Internet and website search data, or any combination thereof.

As used herein, the term "interface" may refer to any device display and/or input/output device that enables a consumer to receive information as an output and enter information as an input. Examples of interfaces include, but are not limited to a television screen, mobile phone, or vehicle display panel that may comprise an interactive programmable touch panel display or a programmable display with an integrated virtual or physical keyboard, a voice input and/or output device or interface, or any combination thereof.

As used herein, the term "merchant" may include an entity that engages in transactions. A merchant may sell goods and/or services or provide access to goods and/or services.

FIG. 1 illustrates a non-limiting embodiment of at least one real-time merchandising system 101 that is programmed or configured to enable virtual real-time merchandising without the need for a direct face-to-face or ecommerce interaction. Real-time merchandising system 101 may be implemented across one or more physical or virtual computing devices loaded with instructions in a new ordered combination as otherwise disclosed herein to implement the functions and algorithms of this disclosure. The example components of real-time merchandising system 101 may be implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. Real-time merchandising system 101 illustrates only one of many possible arrangements of components configured to execute the programming described herein. Other arrangements may include fewer or different components, and the division of work between the components may vary depending on the arrangement.

Real-time merchandising system 101 may interact with at least one consumer device 102, which appears in FIG. 1 as a mobile device. Nevertheless, a consumer device 102 may take one of many forms, including, but not limited to a smartphone, a wearable device, a vehicle, a tablet PC, or the like. Although FIG. 1 depicts only a single consumer device 102, in other embodiments, a plurality of such consumer devices may exist, as for example a consumer device 103, shown as a mobile phone, that may be in communication with consumer device 102 and/or with another device or system like 101, as represented by the communication channel 107, communication channel 108, and communication channel 109.

Consumer device 102 may be programmed or configured to receive, process and broadcast communications, including, but not limited to, a capability to determine and communicate the location of consumer device 102 (for example, using transceiver, processor and telecommunication information, global positioning system information, and/or altimeter information processing functionality built into consumer device 102) or to enable such a device to communicate with real-time merchandiser system 101 if it is also transceiver and processor enabled and programmed or configured with the appropriate communication and processing functionality. For example, as depicted in FIG. 1, consumer device 102 may be communicatively coupled to real-time merchandising system 101 via at least one communication channel 104.

Real-time merchandiser system 101 is a computing device that may be programmed or configured to perform processing and communication of data. In a non-limiting embodiment, real-time merchandising system 101 may be affiliated with at least one or more merchant 106. Real-time merchandising system 101 may be programmed or configured to receive location data from consumer device 102 over communication channel 104. In response to receiving the location data from consumer device 102, real-time merchandising system 101 may be programmed or configured to generate or select at least one offer 105 for communication to consumer device 102 over communication channel 104. Offer 105 may be a digital representation of a code, coupon, discount, rebate, or other similar offer of a financial transaction for use at the merchant 106. In a non-limiting embodiment, offer 105 may include information regarding the characteristics of an offer, including, but not limited to an identification of the merchant 106 where an offer 105 is valid, a type of offer, an offer amount, an expiration date of the offer, an identification of a valid consumer for which the offer is limited to, for example, the owner of consumer device 102.

Real-time merchandising system 101 may be programmed or configured to transmit or broadcast offer 105 to consumer device 102 using at least one communication 104. In response to receiving offer 105, consumer device 102 may store offer 105, communicate offer 105 to at least one second consumer device 103, via a communication channel 109, wherein the second consumer device 103 may itself, store the offer 105. Once stored on one or both consumer device 102 and/or 103, offer 105 may be displayed on at least one interface of consumer device 102 and/or 103 to at least one consumer in real-time or it may be saved for display at a time that the consumer interacts with consumer device 102 and/or 103, or be preprogramed or preconfigured for when an offer 105 should be displayed. When offer 105 is displayed, the consumer may either accept or reject offer 105 via a user input into consumer device 102 and/or 103. The acceptance or rejection messages may be communicated by at least one communication channel 104 or 107, and/or 108 to real-time merchandising system 101 and/or by communication channel 108 from real-time merchandising system 101 to the merchant 106, for further processing. Communication channel 104 and communication channel 107 may originate from at least consumer device 102 or 103, respectively. The consumer may select which consumer device 102 and/or 103 to use, if not both. For the purposes of the discussion below the at least one consumer device 102 and 103 may be interchangeable and potentially in communication with one another, as shown in FIG. 1.

Figure 2:
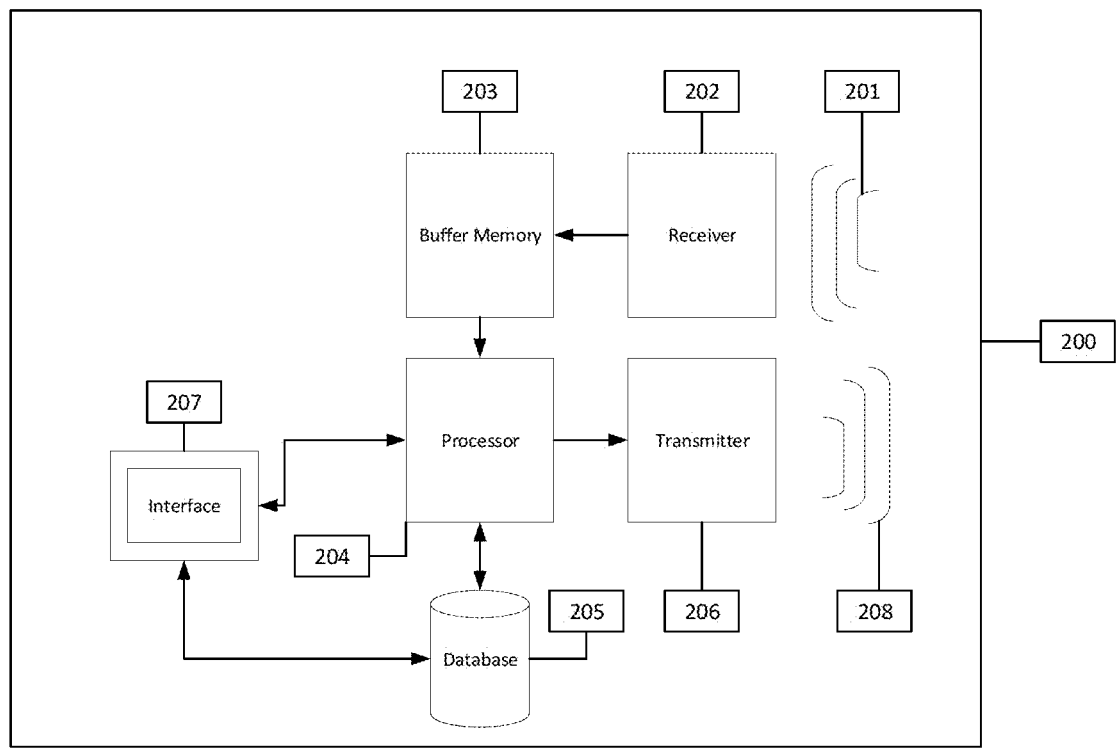
FIG. 2 is a non-limiting block diagram of a device's processing components according to one or more embodiments of the present disclosure.
Figure 3:
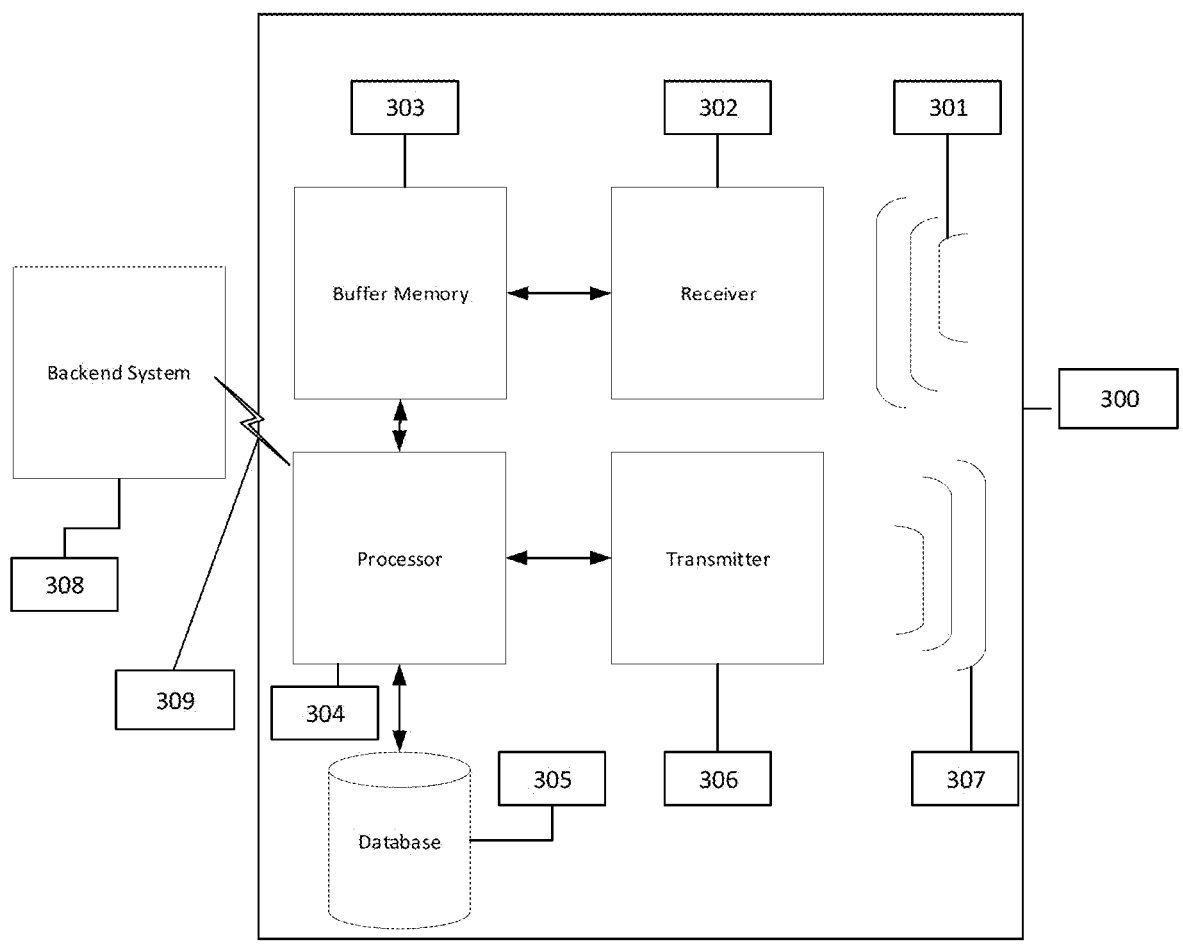
FIG. 3 is a non-limiting block diagram of a merchandising system's components according to one or more embodiments of the present disclosure.

FIG. 2 and FIG. 3 illustrate possible embodiments of at least one device processing system 200 and at least one merchandising system 300, respectively. FIG. 2 illustrates a non-limiting embodiment of components that may comprise at least one device processing system 200 in which the techniques described herein may be practiced according to some non-limiting embodiments. FIG. 3 illustrates a non-limiting embodiment of components that may comprise at least one merchandising system 300 in which the techniques described herein may be practiced according so some non-limiting embodiments.

The exemplary non-limiting embodiments of the device processing system 200 and merchandising system 300 may each be programmed or configured to secure and efficiently initialize and run components within one or more host processing and communication infrastructures. The exemplary device processing system 200 and merchandising system 300 may each be implemented across one or more physical or virtual computing devices, none of which is intended as a generic computer, since it is loaded with instructions in a new ordered combination as otherwise disclosed herein to implement the functions and algorithms of this disclosure. The example component of device processing system 200 and/or merchandising system 300 may be implemented at least partially by hardware of one or more processing systems, such as one or more hardware processors executing stored program instructions stored in one or more memories for performing the functions that are described herein. The hardware processors may be microprocessor, system on a chip, or one or more virtual machine instances in a shared computing facility such as a cloud computing center that may be coupled by wired or optical busses or by one or more communication capabilities noted above. Memory may be a random access memory (RAM) or other dynamic storage device for storing information and software instructions to be executed by a processor, read only memory (ROM) or other static storage device for storing static information and software instructions for processors, or a mass storage device for storing information and software instructions on fixed or movable media, such as magnetic, optical, solid-state, magnetic-optical, flash memory or any other available mass storage technology.

The functions described herein are intended to indicate operations that may be performed using programming in a special-purpose computer or general-purpose computer in various non-limiting embodiments. The device processing system 200 and merchandising system 300 each illustrate only one of many possible arrangements of components configured to execute the programming described herein. Other arrangements may include fewer or different components, and the division of work between the components may vary depending on the arrangement.

2.1 Non-Limiting Embodiments of Representative System Components—

2.1.1 Consumer Initiated

FIG. 2 illustrates at least one non-limiting embodiment of at least one device processing system 200. At least one database 205 may store at least partial data, which may or may not be anonymized, within device processing system 200 about the at least one consumer using the device. Database 205, for example, may store and provide partial encrypted or hashed data associated with the at least one consumer's identity, partial assertion profile data associated with the consumer (for example, including, but not limited to, the facts that the consumer is above a certain age, a frequenter of one or more certain merchant categories, a home owner, a veteran, the owner of a passport and/or driver's license), at least one interest of the consumer, at least one purchase that the consumer made, or any combination thereof, collectively referred to as "stored data", and may also include additional types of data described below. Processor 204 may access and process the stored data within database 205. Processor 204 may also receive at least partial device location data received from a satellite system (for example, the Global Position System) or from a telecommunication network or system (neither shown). In response to receiving the at least partial consumer data and at least partial location data, processor 204 may communicate this information to at least one transmitter 206, in response to which transmitter 206 may communicate the at least partial consumer data and/or the at least one device's partial location data as at least one communication 208. Communication 208 may then be received as a communication 301 by at least one merchandising system 300 depicted in FIG. 3.

FIG. 3 exemplifies at least one non-limiting embodiment of at least one merchandising system 300. At least one receiver 302 may be programmed or configured to receive at least one communication 301, which may contain at least partial consumer and/or location data. Received communication 301 may be stored in at least one buffer memory 303, in response to which it may be communicated to at least one processor 304 wherein it may be processed to extract the partial consumer and/or location data. Using the extracted partial consumer and/or location data, processor 304 may then be programmed or configured to access at least one database 305, to search for at least one partial commercial data associated with at least one consumer that matches the partially extracted consumer and/or location data. In response to processor 304 finding at least one commercial data associated with the at least one consumer and/or location, processor 304 may be programmed or configured to communicate with database 305 and determine if there is at least one offer 105 that may be communicated to the at least one consumer device 102. If at least one offer 105 may be determined to be appropriate, processor 304 may be programmed or configured to select offer 105 and communicate it to at least one transmitter 306, in response to which transmitter 306 may be programmed or configured to communicate offer 105 as at least one communication 307. If processor 304 does not determine that at least partial commercial data associated with the at least one consumer is stored in database 305, it may select at least one offer 105 that may be pre-selected for communications associated with the received partial location data. If there is no at least one offer 105 that may be associated with the received partial location data, then either no at least one offer 105 may be selected or communicated or at least one pre-selected default offer 105 may be selected and communicated.

The at least one receiver 202 of device processing system 200 may receive communication 307 as at least one communication 201 and store it in at least one buffer memory 203, in response to which it may communicate the communication 201 to processor 204. Processor 204 may be programmed or configured to process the communication 201, extract offer 105 and format offer 105 for display on at least one device interface 207. When displayed a consumer may choose to accept, reject or ignore offer 105. The consumer's acceptance or rejection response may be input into device interface 207, in response to which the device may be programmed or configured to communicate the response to processor 204 for processing, formatting and communication via transmitter 206. Transmitter 206 may communicate a response message as at least one communication 208, which may, in turn, be received by receiver 302 of the merchandising system 300 as at least one communication 301. Receiver 302 may be programmed or configured to store communication 301 in at least one buffer memory 303, in response to which it may be communicated to processor 304, which may be programmed or configured to extract the acceptance or rejection response of offer 105 by the at least one consumer.

Processor 304 may be further programmed to time-out if it does not receive an acceptance or rejection response for offer 105 from the at least one consumer within at least one predefined time interval. After either an acceptance or rejection response is received by merchandising system 300, or the programmed time-out period expires, then offer 105 may be restored in database 305 for use at another time or with at least one other consumer.

If the consumer accepted offer 105, then processor 304 may be programmed or configured to extract the at least one consumer's partial data and communicate it as communication 307 over at least one communication channel 309 to at least one backend system 308 of the merchant and/or the merchant's acquiring bank by way of communication 307. Backend system 308 may be programmed or configured to process a payment and to track and analyze an offer campaign. The offer tracking and campaign analysis may include, but not be limited to, aggregating and performing statistical analyses related to the number of offers accepted, rejected and/or not responded to by an offer made, a signage location, a signage type, a time of day, a consumer, a consumer device type, a consumer account, or any combination thereof.

If the consumer rejects offer 105, processor 304 may be programmed or configured to extract the consumer's partial data and communicate it by way of communication 307 over communication channel 309 to the at least one backend system 308 programmed or configured to perform the described offer tracking and analysis. Similarly, if no communication 301 from the at least one consumer is received in the at least one pre-defined time interval, the lack of a response may be communicated by way of communication 307 over communication channel 309 to backend system 308 of the merchant and/or the merchant's acquiring bank for offer campaign tracking and analysis as described above.

If the at least one consumer accepts offer 105, then the consumer's payment data must be obtained for payment processing by backend system 308. The payment data (which may include, but not be limited to a PAN, token, CVV, transaction amount, merchant name and location, or other identifier, or any combination thereof) may be obtained in one of many ways. For example, in one embodiment, processor 304 may be programmed or configured to access the payment data from database 305 if the at least one consumer authorized it to be stored in merchandising system 300. In another embodiment, the consumer may use a device interface to input the payment data into at least one of his or her devices upon acceptance of offer 105 in response to which the device processing system 200 may be programmed or configured to communicate the payment data to merchandising system 300, to backend system 308 or any combination thereof. In another embodiment, if merchandising system 300 does not find the payment data stored in database 305, merchandising system 300 may be programmed to communicate a request that may be displayed on the device interface 207 of the at least one consumer's device to input payment data into his her device and instruct that it be communicated back to merchandising system 300, backend system 308 or any combination thereof as at least one communication 208.

2.1.2 Merchant Initiated

In an alternative embodiment of the at least one merchandising system 300, transmitter 306 may continuously, or repeatedly according at least one predetermined schedule, communicate at least one offer 105 as communication 307 that may be received as the communication 201 by the receiver 202 in a least one device processing system 200 when the at least one consumer may be in a location that enables at least one consumer device 102 and/or 103 to receive offer 105. Offer 105 may be one selected based on the location of the merchant's merchandising system 300 or as a default.

The receiver 202 may be programmed or configured to receive communication 307 as the communication 201, in response to which it may programmed or configured to process, format and store it in buffer memory 203, in response to which the formatted communication may be communicated to processor 204. Processor 204 may be programmed and configured to process, extract and format offer 105 for display on the at least one consumer's device interface 207. Once displayed, the consumer may choose to accept or reject offer 105. The consumer may input his or her choice using the device interface 207 that may be programmed or configured to process and format the input and communicate it as in instruction to processor 204. Processor 204 may itself be programmed and configured to further process the instruction, including the formatting the instruction and communicating the instruction to transmitter 206 that may be programmed and configured to receive the instruction and to process and communicate the consumer's response as the least one communication 208. Processor 204 may be further programmed or configured to access database 205 to search for, access, process and instruct the communication of the consumer's at least partial payment information as a communication 208 by transmitter 206.

The at least one communication 208 may be received as communication 301 by receiver 302 of the at least one merchandising system 300. Receiver 302 may be programmed and configured to process and format communication 301 and instruct that it be stored in buffer memory 303, in response to which it may be communicated to processor 304 which may itself be programmed or configured to access it and further process it to extract at least partial data from the receive communication 208.

If the consumer accepted offer 105, then processor 304 may be programmed or configured to extract and process the at least one consumer's received at least data, which may include, but not be limited to the consumer's acceptance of offer 105, the consumer's partial payment information, or any combination thereof. Processor 304 may be further programmed to format the extracted at least partial consumer data and instruct its communication by transmitter 306 as communication 307 over communication channel 309 to backend system 308 of the merchant and/or merchant's acquiring bank for payment processing and offer campaign tracking and analysis as described earlier.

If the at least one consumer rejects offer 105, processor 304 may be programmed and configured, as described above, to extract, process and format the at least consumer's partial data and instruct transmitter 306 to communicate it as communication 307 over communication channel 309 to backend system 308 for offer tracking and campaign analysis.

Finally, if no communication 301 from the at least one consumer may be received in at least one pre-defined time interval, then processor 304 may be programmed or configured to determine that no response may have been received during the pre-defined time period and to instruct that the lack of a response be communicated by transmitter 306 as communication 307 over channel 309 to backend system 308 of the merchant and/or the merchant's acquiring bank for offer campaign tracking and analysis.

2.2 Non-Limiting Embodiments of Processing

As a further improvement of the present disclosure, the communications described between one merchandising system 300, device processing system 200 and backend system 308 may take place between or among one or more of the following networks and protocols. Examples may include, but not be limited to, third-generation (3G), fourth-generation (4G), fifth-generation, (5G), Long-term Evolution (LTE), and other predecessor, future generation or similar networks, Local Area Net (LAN) networks based on the IEEE 802.11x standard (Wi-Fi®), Bluetooth® Based on Bluetooth® Special Interest (SIT) Standards, Wide Area Net (WAN) networks based on the IEEE 802.16 set of standards (Wi-Max), Near Field Communications (NFC) based on SO/IEC 18092/ECMA-340-Near Field Communication Interface and Protocol-1 (NFCIP-1), ISO/IEC 21481/ECMA-352-Near Field Communication Interface and Protocol-2 (NFCIP-2), and a variety of existing standards including ISO/IEC 14443 Type A and Type B, and FeliCa, Broadband B-ISDN, TCP/IP (which as a minimum may include, but not be limited to, the Internet Protocol (IP), Address Resolution Protocol (ARP), Internet Control Message Protocol (ICMP), Transmission Control Protocol (TCP), User Datagram Protocol (UDP), Internet Group Management Protocol (IGMP), Neighbor Discovery Protocol (NDP), ICMPv6, and IGMPv6 and an integrated IPSec security layer), Simple Message Transfer Protocol (SMTP), File Transfer Protocol (FTP), Code-Division Multiple Access (CDMA) protocol, Global System for Mobile (GSM) protocol, or any such preceding or future networks and/or those which may emerge, that may provide access to a network such as the Internet, a private network or a device, or any combination thereof. The example protocols may support network connectivity by specifying how offer 105 and the at least one consumer's acceptance or rejection responses, consumer information, payment information, or any combination thereof, should be formatted, processed, addressed, transmitted, routed and received.

Additional examples may include Ethernet, Fast Ethernet, IEEE 802.x standards, Local Talk, FDDI, and token ring wired standards and protocols and their future evolutions and equivalents. Further examples may include ESCON/SBCON (Enterprise System Connection/Serial Byte Connection), FDDI (Fiber Distributed Data Interface), Fibre Channel Standard, ATM (Asynchronous Transfer Mode)/SONET (Synchronous Optical Network), Gigabit Ethernet optical standards and protocols and their future evolutions and equivalents.

The device and merchandising system processors 204 and 304, shown respectively in FIG. 2 and FIG. 3, may each comprise a general purpose computer, microcontroller, microprocessor, application specific integrated circuit, digital signal processor (DSP), programmable logic circuit, state machine, or other data processing device, or any combination thereof. The processors may execute application programming instructions stored in the memories shown in the figures. The buffer memories and database memories may include one or more of read-only memory (ROM), random-access memory (RAM), digital random access memory (DRM), electrically erasable programmable ROM (EEPROM), flash cards, or any memory common to mobile or computer platforms. One or more input/output (1/O) interfaces may be configured to implement the network protocols described above.

The backend system 308 may include, but not be limited to a mainframe computer, a public or private cloud-based system, a private or public server farm with mass memory, hard-drive memory, magnetic memory, disc memory using relational, object-oriented, hierarchical, block chain, graphical database structures managed using a commercial or proprietary database management system, or any combination thereof.

The receivers, transmitters, processors, memories shown in FIG. 2 and FIG. 3 may all be used cooperatively to load, store and execute offer, display, payment, response, management, tracking and analysis functions that have been described. Consequently, the logic used to manage these functions may be distributed over the various elements. Alternatively, the functionality could be incorporated into one discrete component. For example, the receiver and transmitter may be into one integrated transceiver which may incorporate, but not be limited to an antenna, a modem, a modulator and/or demodulator.

Within a consumer device and merchant merchandising system, communications between receivers, buffer memories, processors, databases and transmitters may take place over wired bus, an optical bus, another communication mechanism, or any combination thereof.

2.3 Non-Limiting Embodiments of Enabling Software

In one or more non-limiting exemplary aspects, the functions described may be executed in hardware, software, firmware, or any combination thereof. If performed in software, the functions may be stored on, or communicate as, at least one instruction, or at least one or more lines of code, using computer memory media and any communication media that facilitates transferring computer instructions and/or software from one place to another.

The logic configured to receive and/or transmit offer, payment, consumer, and/or acceptance or rejection information may include software that when executed, permits the associated hardware of the logic configured to receive and/or transmit information to perform its reception and/or transmission function(s). Further, the software may work with the logic to perform memory and database functions that store information in and/or retrieve information from the memories and databases expressed in FIG. 2 and FIG. 3.

Embodiments of the systems of FIG. 2 may include a device interface 207, and the system logic may be configured to present information to at least one consumer and receive at inputs from the at least one consumer. The at least one interface may include at least one display screen, at least one port that can carry text and video information, at least one speaker that can output audio information, at least one input device that may include a microphone for voice inputs, or a physical control panel with at least one button and/or keyboard or a touchscreen display, the logic and control software for which may configure the panel as a virtual keyboard, at least one button, at least one response icon, or any combination thereof, for the at least one consumer's inputs.

The logic and software of the at least one processors depicted in FIG. 2 and FIG. 3 may, among other operations, process determinations, manage connections and routings, choose among information options, conduct data assessments, convert information from one format to another (e.g., between different protocols), or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

3.0 Non-Limiting Embodiments of Process Steps

Figure 4:
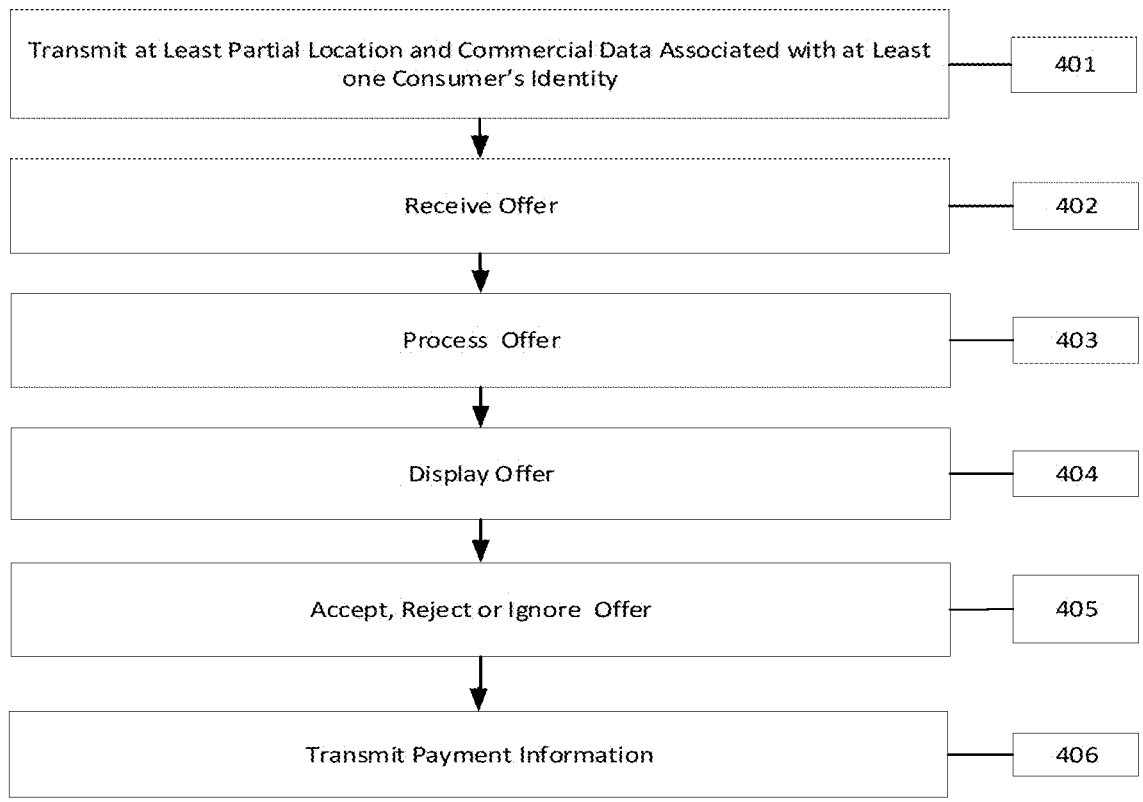
FIG. 4 is a non-limiting flow diagram of device processing steps according one or more embodiments of the present disclosure.

FIG. 4 is intended to disclose at least one non-limiting process flow that may be used as a basis of writing computer programs to implement the functions that are described herein, and which cause at least one device processing system 200 to operate in the new manner that is disclosed herein. Further, FIG. 4 is provided to communicate such a non-limiting algorithm, process and/or function at the same level of detail that is normally used, by persons of skill in the art to which this disclosure is directed, to communicate among themselves about plans, designs, specifications and algorithms, processes and/or functions for other computer programs of a similar level of complexity. The numbered steps of FIG. 4 may be performed in any order, and are not limited to the order shown in FIG. 4.

In step 401, at least one device processing system 200 may be programmed or configured to receive, access, process, and/or communicate at least partial location data, commercial data, payment data, or any combination thereof, associated with at least one consumer. Partial location data may include, for example, GPS data, street coordinates or intersection data, zip code data, or triangulated telecommunication cell tower data. The partial location data may be retrieved by device processing system 200 from buffer memory 203 (for example when real-time GPS or triangulated telecommunication cell tower data may be involved) or database 205 where "stored data" may also include partial location data (for example when stored zip code data may be involved). Commercial data may include, for example, but not limited to, a home address, shipping information (such as a preferred address), a consumer's interest or purchase priorities, or any combination thereof. Partial payment data may include, but not be limited to, an account number, token data, an address, an expiration date, a security code (for example, a card verification value (CVV)), or any combination thereof. The partial location data, payment data and/or commercial data may be communicated from the device processing system 200 to at least one merchant's at least one merchandising system 300 over one or more communication channels, including but not limited to WiFi, Cellular, Bluetooth, or any combination thereof.

The at least one consumer's at least one device processing system 200 may be programmed or configured to communicate the at least partial location, payment and/or commercial data, or any combination thereof, continuously by transmitter 206 or periodically by transmitter 206. It is also possible for the at least one device processing system 200 to be programmed or configured to not communicate the at least partial location, payment and/or commercial data until at least one offer 105 is received that is accepted, in which case the at least one process flow may begin with step 402.

In step 402 the at least one device processing system 200 may be programmed or configured to receive at least one offer 105 as at least one communication 201 received, processed and formatted for subsequent processing by at least one receiver 202. The communication channel may include, but not be limited to WiFi®, Cellular, Bluetooth®, or any combination thereof, wherein the received communicated offer 105 may be temporarily stored in buffer memory 203 prior to being communicated to or accessed by processor 204.

In step 403 offer 105 is communicated to or accessed by at least one configured or programmed processor 204, wherein it may be processed using digital processing, natural language processing, syntactic analysis, semantic analysis, or any combination thereof, to extract details of offer 105. These details may include, but not be limited to, product information, product price information, discount information, offer eligibility information, merchant information, offer fulfillment information, offer duration information, or any combination thereof. Once processed the extracted offer details may be stored in database 205 or in buffer memory 203.

Processor 204 may be programmed or configured to further process offer 105 by searching for and accessing at least one consumer interest criterion from database 205 by at least partially matching offer 105 to at least on consumer interest criterion. The at least one consumer interest criterion may include, but not be limited to, one or more product categories that the at least one consumer selects from a list and/or enters into device interface 207 and stores in database 205, a stored search history or an extracted summary of the items most often searched for that is stored in database 205, a specific item that the at least one consumer inputs into device interface 207 and/or stores in a database 205, or any combination thereof. Device interface 207 may be, but is not limited to, a digital keyboard, voice generation and/or recognition system, an interactive touch panel, or any combination thereof.

If as a result of processor 204 processing it is determined that there is at least a partial match between offer 105 and the consumer's at least one interest criterion using what may include, but not be limited to digital analysis, semantic analysis, pattern matching analysis, character analysis and matching, or any combination thereof, then in step 404 offer 105 may be displayed to the at least one consumer on or by device interface 207 for the consumer to review and respond to. If there is not at least a partial match between offer 105 and the consumer's at least one criterion interface, then the at least one device processing system 200 may programmed or configured to not display offer 105 in step 404, in which case processing may stop and steps 405 and 406 may not be executed.

Alternatively, device processing system 200 may be programmed or configured to store offer 105 in database 205 for the consumer's later access, review and response. Further, device processing system 200 may be programmed or configured to auto-accept or auto-reject offer 105 if it does or does not at least partially match at least one of the consumer's stored interest criterion, respectively.

If the at least one consumer accepts or rejects offer 105, then in step 405, the at least one consumer may input their acceptance or rejection of offer 105 into device interface 207. The input into device interface 207 may include, but not be limited to, a voice input, a typed input, a selection from a pull down menu, a check placed into a box among displayed input options, or any combination of the above.

Processor 204 may be programmed to configured to receive the input from device interface 207, in response to which processor 204 may be programmed or configured to instruct communicating of the at least one consumer's acceptance or rejection of offer 105, wherein it communicates the acceptance or rejection instruction to transmitter 206, which communicates the acceptance or rejection response as at least one communication 208.

If the at least one consumer decides not to accept or reject offer 105 at the time it is displayed, then the consumer may input an instruction into device interface 207 to store offer 105. In response to receiving the instruction, processor 204 may be programmed or configured to store offer 105 in database 205 for its later access, review, and response by the at least one consumer. Processor 204 may also be programmed or configured to delete the at least one communicated offer if an acceptance or rejection response is not input into device interface 207 within a predefined time period or, if it is stored in database 205 for later access and review and it is not accessed within a predefined time period.

If offer 105 is accepted, then in step 406 processor 204 may be programmed or configured to access database 205 to access the at least one consumer's at least partial payment and commercial information described above, and to instruct the communication of that at least partial information to transmitter 206 and further instruct that it be communicated in at least one second communication 208 over the communication channels described above to the at least one merchandising system 300, backend system 308, or any combination thereof.

If offer 105 is rejected, then the at least one device processing system 200 may be programmed or configured to instruct that a rejection response be communicated to merchandising system 300, backend system 308, or any combination thereof. If neither an acceptance nor a rejection response is input by the consumer within a programmed period of time, or if offer 105 times out within a programmed period of time, then device processing system may be programmed to either send no response, or to send a response that indicates that the consumer inputs no response within one or the other programmed period of times.

The backend system 308 may be programmed or configured to fulfill offer 105 if offer 105 has been accepted, perform acceptance and non-acceptance related analyses, offer campaign analyses, or any combination thereof. The analyses performed may include, but not be limited to, aggregated offer acceptances, rejections and/or no-responses received by offer campaigns, product category, SKU, trend analyses, sales by merchandising signage location, by consumer location, by times-of-day or days-of-the-week, consumer matches, consumer interest matches, or any combination thereof.

Figure 5:
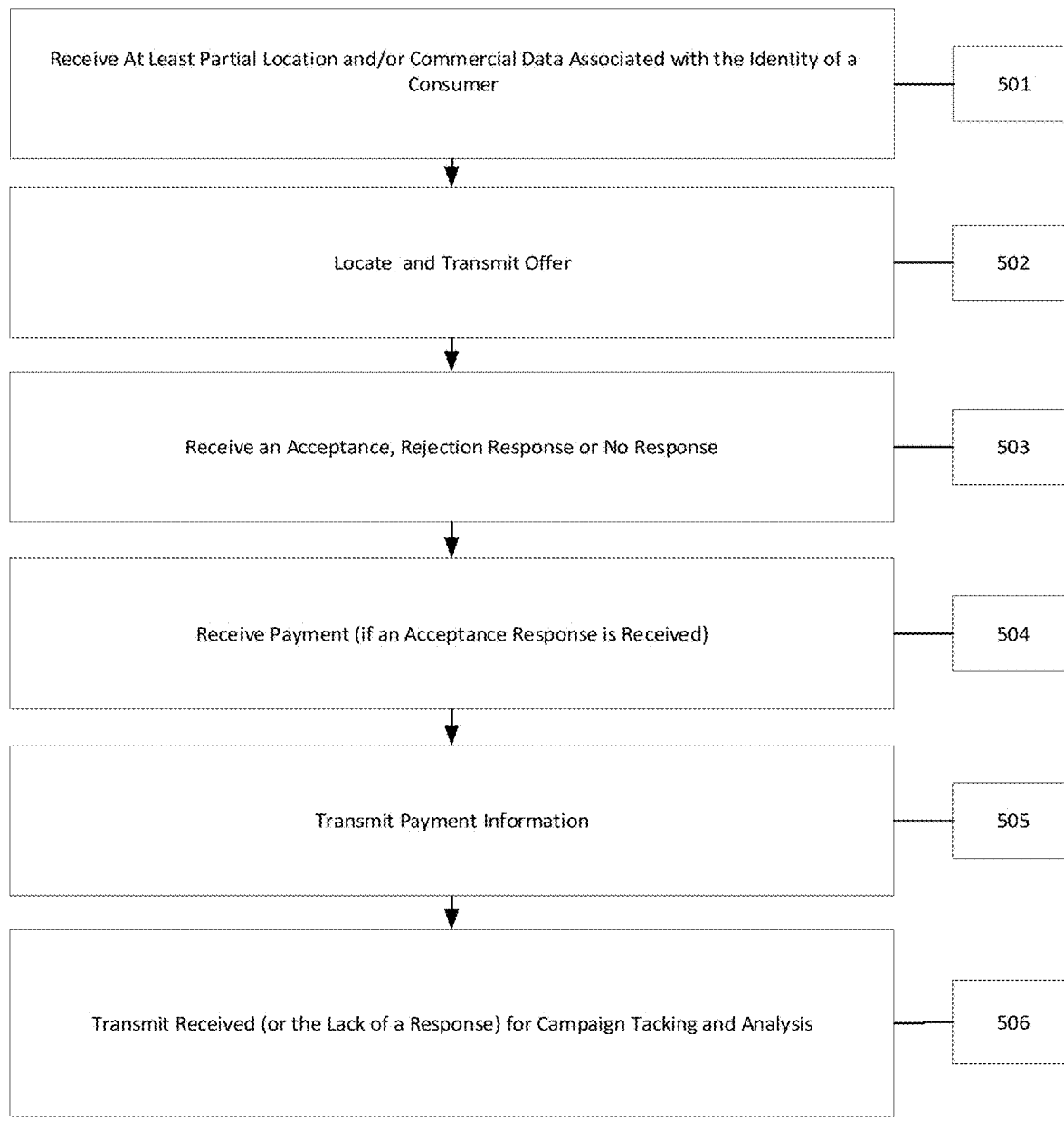
FIG. 5 is a non-limiting flow diagram of merchandising system processing steps according one or more embodiments of the present disclosure.

FIG. 5 illustrates a flow diagram of a non-limiting example of process steps for performing automated configuration and replication of repositories using merchandising system 300, according to non-limiting embodiments. FIG. 5 is intended to disclose non-limiting algorithms, processes and/or functional descriptions that may be used as a basis of writing computer programs to implement the algorithms, processes and/or functions that are described herein, and which cause at least one merchandising system 300 to operate in the new manner that is disclosed herein. The numbered steps of FIG. 5 may be performed in any order, and is not limited to the order shown in FIG. 5.

In step 501 the at least one merchandising system 300 may be programmed or configured to receive, at least partially, at least one consumer's location data, payment data, commercial data or any combination thereof.

If the partially received location, payment and/or commercial data associated with the at least one consumer is received by merchandising system 300, then processor 304 may be programmed or configured in step 502 to search, access and select at least one offer 105 from database 305 that may be based on a determination that there is at least a partial match between the at least partially received data and at least one consumer's location, payment, or consumer data, or any combination thereof, that the least one merchandiser may have stored in database 305. If no at least one partial match is determined between the partial data is received and the data stored in database 305 then in step 502, the at least one merchandising system 300 may be programmed or configured to pre-select and communicate at least one offer 105 based on its location or at least one default offer 105.

In step 503, merchandising system 300 may be programmed or configured to receive at least one communicated acceptance or rejection of offer 105. If offer 105 is accepted, then merchandiser system 300 may be further programmed or configured to receive at least partial payment information in step 504 from the at least one consumer, in response to which it may be still further programmed or configured to process the information, to store the response in database 305, and to instruct and communicate the at least partial payment information to at least backend system 308 for payment processing and order fulfillment in step 505.

If offer 105 is rejected, then merchandising system may be configured or programmed to process the response, store the response in database 305 and to instruct and communicate the response to backend system 308.

When offer 105 is accepted or rejected, or if no response is received after a pre-selected time interval, then in step 506, the acceptance, rejection, or no-response response, or the lack of any response, the merchandising system 300 may be programmed or configured to communicate this information to the at least one merchant's, and/or merchant's acquiring bank's backend system 308, wherein backend system 308 may be programmed or configured to fulfill offer 105 if offer 105 has been accepted and perform acceptance and non-acceptance related analyses, offer campaign analyses, or any combination thereof. The analyses performed may include, but not be limited to, aggregated offer acceptances, rejections and/or no-responses received by offer campaigns, product category, SKU, trend analyses, sales by merchandising signage location, by consumer location, by times-of-day or days-of-the-week, consumer matches, consumer interest matches, or any combination thereof.

4.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming or configurations in a special-purpose computer or general-purpose computer, in various embodiments. In other words, each flow diagram in this disclosure, in combination with the related text herein, is a guide, plan or specification of all or part of an algorithm for programming or configuring a computer to execute the functions that are described and have been prepared to convey information at a level of sufficiency and detail that is normally expected in the field when skilled persons communicate among themselves with respect to programs, algorithms and their implementation.

In the foregoing specification, the example non-limiting embodiments of the present disclosure have been described with reference to numerous specific details. However, the details may vary from implementation to implementation according to the requirements of the particular implement at hand. The example non-limiting embodiments are, accordingly, to be regarded in an illustrative rather than a restrictive sense.

What is claimed is:

1. A computer-implemented method comprising:
   receiving, by a real-time merchandising system, consumer data from a first device of a consumer, the consumer data comprising at least one of the following: partial location data, payment data, commercial data, or any combination thereof;
   processing, by the real-time merchandising system, the consumer data by at least partially matching the consumer data with second consumer data stored in at least one database of the real-time merchandising system;
   in response to determining at least a partial match between the consumer data received and the second consumer data stored in the at least one database of the real-time merchandising system, generating, by the real-time merchandising system, an offer based on the consumer data;
   transmitting, by the real-time merchandising system, the offer to the first device of the consumer corresponding to the consumer data;
   in response to receiving the offer, communicating, from the first device, the offer to a second device of the consumer;
   receiving, by the real-time merchandising system, an acceptance of the offer from at least one of the first device and the second device; and
   in response to receiving the acceptance of the offer, communicating by the real-time merchandising system, partial consumer data to at least one backend system for payment processing of the offer.

2. The computer-implemented method according to claim 1, in which the real-time merchandising system comprises a movie screen, outdoor sign, billboard, poster, in-store sign, in-home screen or interface, or interface on a mobile device.

3. The computer-implemented method according to claim 1, further comprising:
   generating, by the real-time merchandising system, the offer;
   targeting, by the real-time merchandising system, a consumer upon receiving the consumer data; and
   partially matching the consumer data with data stored in at least one database of the real-time merchandising system.

4. The computer-implemented method according to claim 1, further comprising anonymizing, by the real-time merchandising system, the consumer data, stored data, or any combination thereof.

5. The computer-implemented method according to claim 1, further comprising expiring, by the real-time merchandising system, the offer after receiving either an acceptance or rejection response.

6. The computer-implemented method according to claim 1, further comprising expiring, by the real-time merchandising system, if receiving no acceptance or rejection response after a predetermined time.

7. The computer-implemented method according to claim 1, further comprising communicating, by the real-time merchandising system, the offer based on the real-time merchandising system's location, a time of day, a programmed or pre-selected default, or any combination thereof.

8. A computer-implemented method comprising:
   receiving, by a real-time merchandising system, consumer data from a first device of a consumer, the consumer data comprising at least one of the following: partial location data, payment data, commercial data, or any combination thereof;
   processing, by the real-time merchandising system, the consumer data by at least partially matching the consumer data with second consumer data stored in at least one database of the real-time merchandising system;
   in response to determining at least a partial match between the consumer data received and the second consumer data stored in the at least one database of the real-time merchandising system, generating, by the real-time merchandising system, an offer based on the consumer data;
   transmitting, by the real-time merchandising system, the offer to the first device of the consumer corresponding to the consumer data;
   communicating the offer from the first device to a second device;
   receiving, by the real-time merchandising system, an acceptance of the offer from at least one of the first device and the second device; and
   in response to receiving the acceptance of the offer, communicating by the real-time merchandising system, consumer data to at least one backend system for payment processing of the offer.

9. The computer-implemented method according to claim 8, wherein the real-time merchandising system further comprises communicating the offer in response to receiving the consumer data.

10. The computer-implemented method according to claim 8, wherein the real-time merchandising system further comprises communicating the offer for the consumer in response to receiving at least one interest criterion from the consumer and at least partially matching the received at least one interest criterion with one offer stored in at least one database of the real-time merchandising system.

11. The computer-implemented method according to claim 8, in which the real-time merchandising system comprises a movie screen, outdoor sign, billboard, poster, in-store sign, in-home screen or interface, or interface on a mobile device.

12. A real-time merchandising system comprising:
at least one transmitter;
at least one receiver;
at least one buffer memory;
at least one processor;
at least one database;
at least one non-transitory storage device;
at least one backend system;
one or more programs stored in in the non-transitory storage device and configured for operation by the at least one processor, the one or more programs comprising instructions configured for:
  receiving consumer data from a first device of a consumer, the consumer data comprising at least one of the following: partial location data, payment data, commercial data, or any combination thereof;
  processing the consumer data by at least partially matching the consumer data with second consumer data stored in at least one database of the real-time merchandising system;
  in response to determining at least a partial match between the consumer data received and the second consumer data stored in the at least one database of the real-time merchandising system, generating an offer based on the consumer data;
  transmitting the offer to the first device of the consumer corresponding to the consumer data;
  communicating the offer from the first device to a second device;
  receiving an acceptance of the offer from at least one of the first device and the second device; and
  in response to receiving the acceptance of the offer communicating partial consumer data to the at least one backend system for payment processing of the offer.

13. The real-time merchandising system according to claim 12, in which the real-time merchandising system comprises a movie screen, outdoor sign, billboard, poster, in-store sign, in-home screen or interface, or interface on a mobile device.

14. The real-time merchandising system according to claim 12, further comprising generating the offer and targeting at least one consumer upon receiving the at least one consumer's data and at least partially matching the at least one consumer's data with data stored in at least one database of the real-time merchandising system.

15. The real-time merchandising system according to claim 12, further comprising anonymizing the at least one consumer's data, stored data, or any combination thereof.

16. The real-time merchandising system according to claim 12, further comprising expiring the offer after receiving either an acceptance or rejection response.

17. The real-time merchandising system according to claim 12, further comprising expiring the offer if receiving no acceptance or rejection response after a predefined timeout period.

* * * * *